(12) United States Patent
Suzuki et al.

(10) Patent No.: US 10,115,982 B2
(45) Date of Patent: Oct. 30, 2018

(54) FUEL CELL SYSTEM AND FUEL CELL SYSTEM MODULE

(71) Applicant: Panasonic Corporation, Osaka (JP)

(72) Inventors: Yuya Suzuki, Osaka (JP); Shuji Nakanishi, Osaka (JP); Hiroaki Usui, Osaka (JP); Naoki Yoshikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 349 days.

(21) Appl. No.: 14/895,096

(22) PCT Filed: Mar. 6, 2014

(86) PCT No.: PCT/JP2014/001245
§ 371 (c)(1),
(2) Date: Dec. 1, 2015

(87) PCT Pub. No.: WO2014/199539
PCT Pub. Date: Dec. 18, 2014

(65) Prior Publication Data
US 2016/0111737 A1    Apr. 21, 2016

(30) Foreign Application Priority Data

Jun. 14, 2013    (JP) ................................ 2013-125788

(51) Int. Cl.
*H01M 8/04186* (2016.01)
*H01M 8/24* (2016.01)
(Continued)

(52) U.S. Cl.
CPC ... *H01M 8/04186* (2013.01); *H01M 8/04104* (2013.01); *H01M 8/1004* (2013.01);
(Continued)

(58) Field of Classification Search
CPC ...... H01M 8/16; H01M 8/04186; H01M 8/24; H01M 8/1004; H01M 8/04104; H01M 8/2455; C02F 3/005; Y02E 60/527
See application file for complete search history.

(56) References Cited

U.S. PATENT DOCUMENTS

| 2005/0164069 A1* | 7/2005 | Margiott | H01M 8/04089 |
| | | | 429/432 |
| 2007/0048577 A1* | 3/2007 | Ringeisen | H01M 8/0232 |
| | | | 429/401 |

(Continued)

FOREIGN PATENT DOCUMENTS

| JP | 43-17690 B1 | 7/1968 |
| JP | 2009-037915 A | 2/2009 |

(Continued)

OTHER PUBLICATIONS cK-12, Dalton's Law of Partial Pressure (https://www.CK-12.org/book/Ck-12-Chemistry-Concepts-Intermediate/section/14.12/) 2018.*

(Continued)

*Primary Examiner* — Eugenia Wang
(74) *Attorney, Agent, or Firm* — Renner, Otto, Boisselle & Sklar, LLP

(57) ABSTRACT

A fuel cell system (100) comprises: a plurality of cell units including a first cell unit (10A) and a second cell unit (10B) positioned below the first cell unit (10A) in the vertical direction; and at least one connection portion including a first connection portion (20A) for connecting the first cell unit (10A) and the second cell unit (10B). In the fuel cell system (100), the cell units each have at least one electrode cell (2) equipped with: a processing bath (3) having a flow path (8) for circulating a liquid to be processed; a liquid supply inlet (11A, 11B) for supplying the liquid to be processed to the flow path (8); and a liquid discharging outlet (13A, 13B) for discharging the liquid to be processed from the flow path (8). The first connection portion (20A) has: a connection path (9) for circulating the liquid to be processed discharged from the liquid discharging outlet (13A, 13B) of the first cell unit (10A) to the liquid supply inlet (11A, 11B) of the second cell unit (10B); and an atmospheric pressure adjustment portion for suppressing atmospheric pressure variations caused by the movement of the liquid to be processed in the connection path (9).

11 Claims, 6 Drawing Sheets

(51) Int. Cl.
*H01M 8/04089* (2016.01)
*H01M 8/2455* (2016.01)
*H01M 8/16* (2006.01)
*H01M 8/1004* (2016.01)
*C02F 3/00* (2006.01)

(52) U.S. Cl.
CPC ............... *H01M 8/16* (2013.01); *H01M 8/24* (2013.01); *H01M 8/2455* (2013.01); *C02F 3/005* (2013.01); *Y02E 60/527* (2013.01)

(56) References Cited

U.S. PATENT DOCUMENTS

| | | | | |
|---|---|---|---|---|
| 2007/0184312 | A1* | 8/2007 | Eickhoff | H01M 8/04089 429/444 |
| 2008/0241635 | A1* | 10/2008 | Sato | H01M 8/023 429/404 |
| 2011/0223496 | A1 | 9/2011 | Makita et al. | |
| 2011/0269044 | A1* | 11/2011 | Spoto | H01M 8/0256 429/443 |
| 2011/0300457 | A1* | 12/2011 | Kuehn | H01M 8/04007 429/410 |
| 2012/0003504 | A1 | 1/2012 | Yamazawa et al. | |
| 2013/0059169 | A1 | 3/2013 | Wallin et al. | |

FOREIGN PATENT DOCUMENTS

| | | |
|---|---|---|
| JP | 2010-033824 A | 2/2010 |
| JP | 2010-102953 A | 5/2010 |
| JP | 2011-192558 A | 9/2011 |
| WO | WO-2012120314 A2 * | 9/2012 ............. H01M 8/16 |

OTHER PUBLICATIONS

The MSDS Hyper Glossary, Pressure Unit Conversions (http://www.ilpi.com/msds/ref/pressureunits.html) 2018.*
Extended European Search Report dated May 3, 2016 for corresponding European Application No. 14810705.5.
International Search Report for corresponding International Application No. PCT/JP2014/001245 dated Jun. 10, 2014.

* cited by examiner

FIG.3
(a) 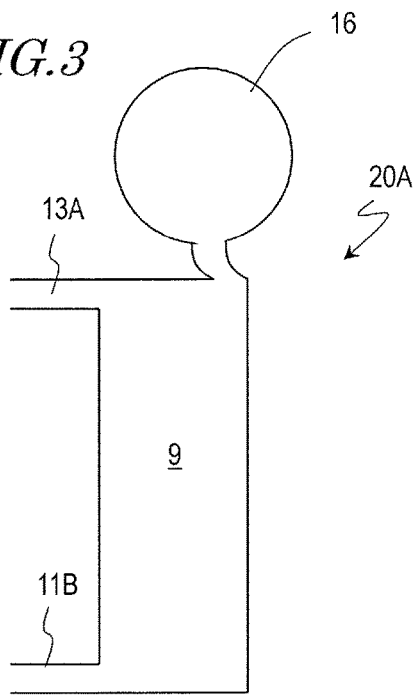
(b) 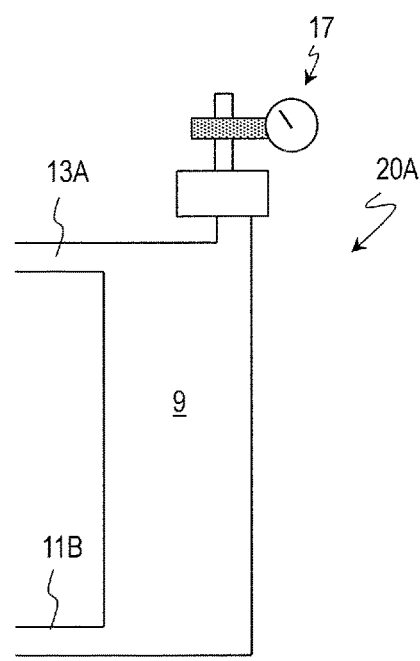
FIG.4
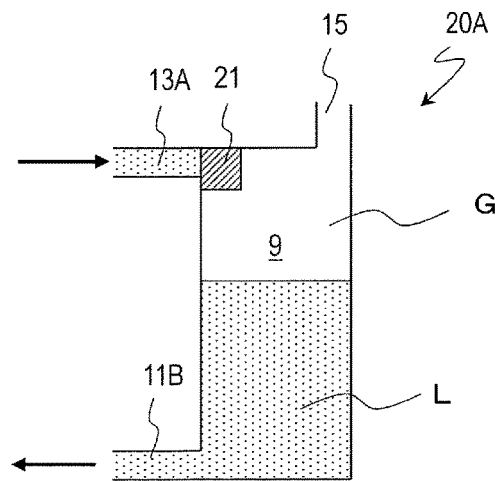

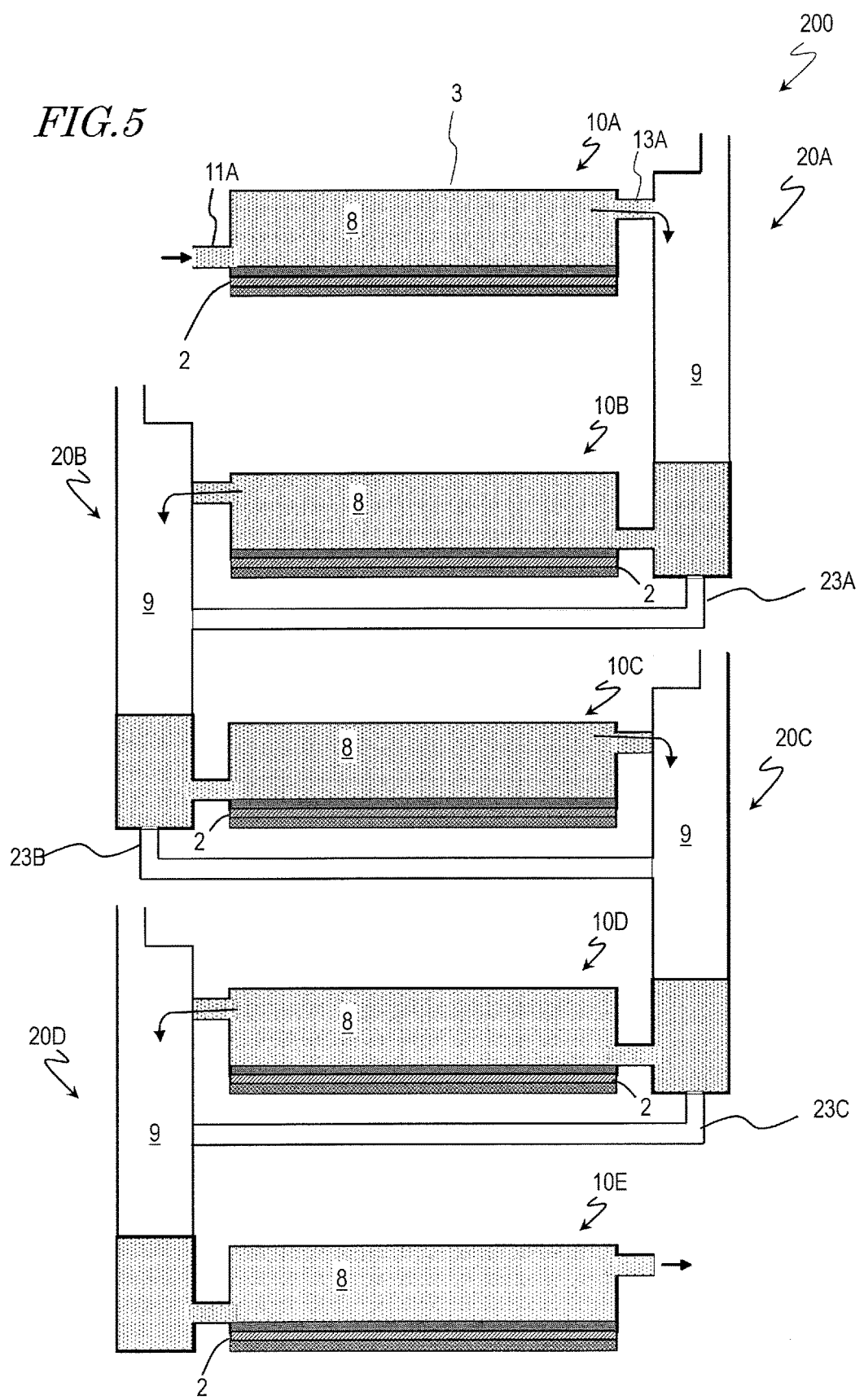

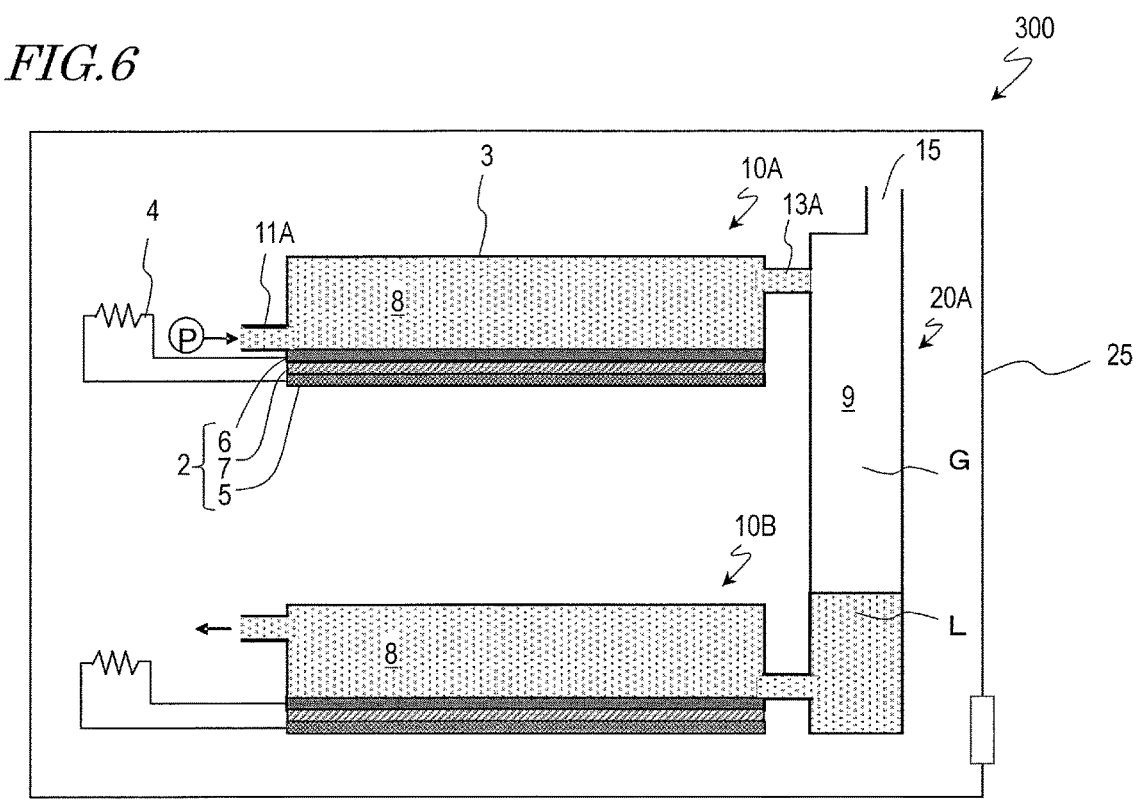
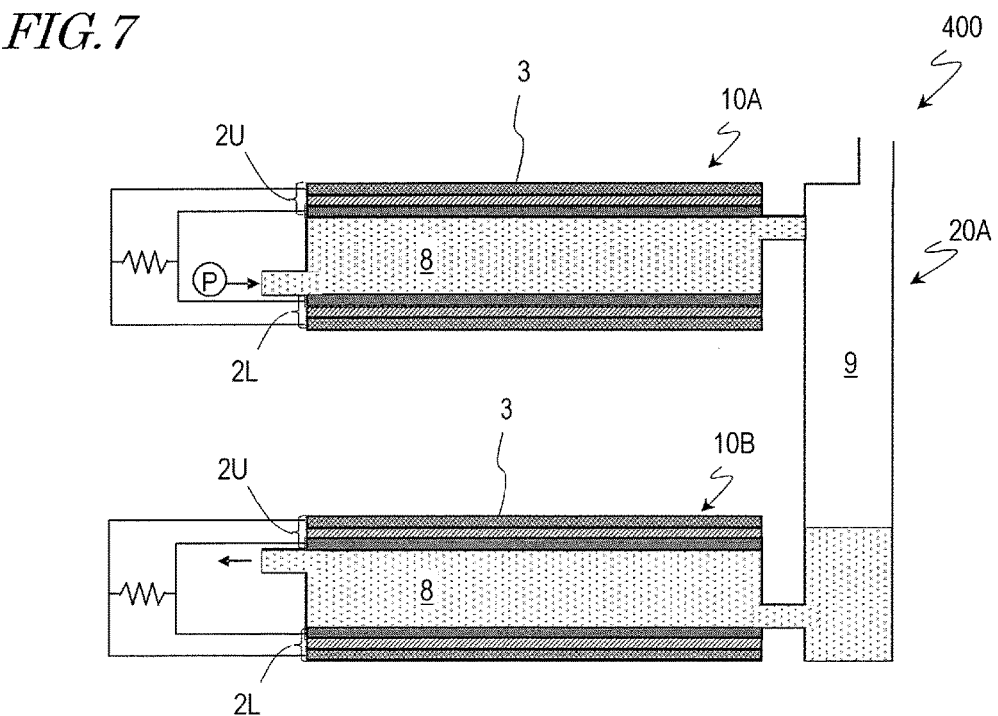

FUEL CELL SYSTEM AND FUEL CELL SYSTEM MODULE

TECHNICAL FIELD

The present application relates to a fuel cell system and a fuel cell system module.

BACKGROUND ART

A microbial fuel cell is a wastewater treatment apparatus of an energy independent type which, while converting chemical energy of organic matter that is contained in wastewater (domestic wastewater or wastewater from plants) into electrical energy, subjects that organic matter to an oxidative degradation treatment.

A microbial fuel cell includes a negative electrode that carries microorganisms thereon and a positive electrode which is allowed to be in contact with an oxidizing substance, where an electrolytic solution containing organic matter is supplied to the negative electrode, and water containing oxygen is supplied to the positive electrode. The negative electrode and the positive electrode are connected with each other via an external circuit, thereby forming a closed circuit. At the negative electrode, hydrogen ions ($H^+$) and electrons ($e^-$) are generated from the electrolytic solution through microbial catalysis, and these hydrogen ions move to the positive electrode, while these electrons move to the positive electrode via the external circuit. At the positive electrode, the hydrogen ions and the electrons having moved from the negative electrode bind with oxygen ($O_2$), thus being consumed to become water ($H_2O$). During this course, the electrical energy that flows in the closed circuit is collected.

A microbial fuel cell directly produces electrical energy from an organic substrate or the like by virtue of catalysis (metabolic reaction, biochemical conversion) of the microorganisms. Therefore, an improved recovery efficiency is expectable over conventional energy recovery systems which employ a step of converting organic matter into a biogas or the like. Moreover, it is usable not only for power generation, but also as equipment associated with wastewater treatment, organic waste treatment, or organic waste treatment, etc.

In recent years, microbial fuel cells which utilize a gas diffusion electrode as a positive electrode have attracted attention (e.g. Patent Document 1). A gas diffusion electrode is made of a material which may be porous or in the form of a woven fabric, for example, and thus is porous. This structure allows oxygen in a gas phase (e.g., the atmospheric air) to be supplied to the positive electrode. That is, the hydrogen ions and electrons from the negative electrode can be allowed to react with oxygen in a gas phase at the positive electrode.

When a gas diffusion electrode allows oxygen in a gas phase to be supplied to the positive electrode, the following advantages are obtained as compared to the case of supplying dissolved oxygen in water to the positive electrode, for example.

Supplying dissolved oxygen to the positive electrode has the problems of oxidation of the organic matter that is contained in the liquid to be treated, e.g., wastewater, and bottlenecking of power generation by the diffusion velocity of dissolved oxygen. On the other hand, oxygen in a gas phase has a much larger diffusion velocity than the diffusion velocity of dissolved oxygen, thereby being able to efficiently achieve oxidation of the organic matter as well as power generation. Thus, improvements in the output power of the fuel cell can be expected.

CITATION LIST

Patent Literature

Patent Document No. 1: Japanese Laid-Open Patent Publication No. 2010-102953

SUMMARY OF INVENTION

Technical Problem

In order to enhance the practicality of a fuel cell system, it is desired to improve the treatment capability and generation output by increasing the throughput of the liquid to be treated, for example. Thus, the inventors have paid attention to a system construction in which a plurality of fuel cells (hereinafter referred to "cell units"), in which gas diffusion electrodes are used, are connected. However, upon a study by the inventors, it was found that in a construction in which a plurality of cell units are connected, depending on the cell unit arrangement, high treatment efficiency or high power generation efficiency may not be obtained. The details will be described later.

One non-limiting, and exemplary embodiment of the present application provides a fuel cell system which can provide enhanced treatment capability or generation output, in which gas diffusion electrodes are used.

Solution to Problem

In order to solve the above problems, one implementation of the present invention encompasses a fuel cell system comprising: a plurality of cell units, including a first cell unit and a second cell unit located below the first cell unit along the vertical direction; and at least one connecting section including a first connecting section to connect the first cell unit and the second cell unit, the plurality of cell units each including: a treatment bath having a flow path through which a liquid to be treated is allowed to flow; a liquid intake port through which the liquid to be treated is supplied to the flow path and a liquid discharge port through which the liquid to be treated is discharged from the flow path; and at least one electrode cell, the at least one electrode cell including a negative electrode, a positive electrode at least a portion of which is a porous body, and an ion-permeable membrane disposed between the positive electrode and the negative electrode, the ion-permeable membrane being electrically non-conductive, the at least one electrode cell being disposed so that the negative electrode is in contact with the liquid to be treated flowing through the flow path, and that the positive electrode is exposed to a gas phase, and the first connecting section including: a connection path through which the liquid to be treated having been discharged from the liquid discharge port of the first cell unit is allowed to flow to the liquid intake port of the second cell unit; and a pneumatic adjustment section to suppress pneumatic fluctuations within the connection path that are associated with movements of the liquid to be treated.

Advantageous Effects of Invention

According to the present invention, a fuel cell system which can provide enhanced treatment capability or generation output, in which gas diffusion electrodes are used can be realized.

BRIEF DESCRIPTION OF DRAWINGS

FIG. 3 (a) and (b) are schematic cross-sectional views illustrating exemplary constructions for a pneumatic adjustment section of the fuel cell system 100.

FIG. 4 A schematic cross-sectional view illustrating another exemplary construction for a first connecting section 20A in the fuel cell system 100.

FIG. 5 A schematic cross-sectional view of another fuel cell system 200 according to the first embodiment.

FIG. 6 A schematic cross-sectional view of a fuel cell system 300 according to a second embodiment.

FIG. 7 A schematic cross-sectional view of a fuel cell system 400 according to a third embodiment.

DESCRIPTION OF EMBODIMENTS

Figure 1:
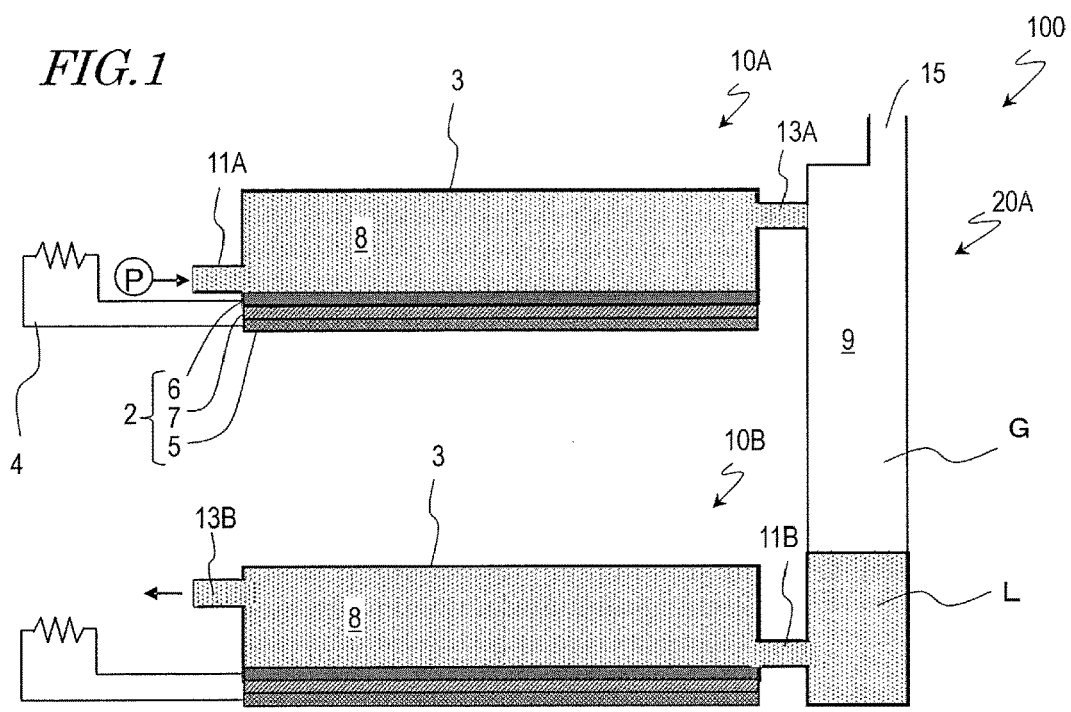
FIG. 1 A schematic cross-sectional view of a fuel cell system 100 according to a first embodiment.

Findings which were obtained by the inventors through a study of system constructions in which a plurality of cell units featuring gas diffusion electrodes were connected will be described.

Each cell unit in which a gas diffusion electrode is adopted as the positive electrode is arranged so that the surface of the gas diffusion electrode is in contact with a gas phase (e.g., atmospheric air) and that the surface of the negative electrode is in contact with a liquid to be treated. The inventors have studied constructions in which such cell units are disposed in the direction of gravity (vertical direction), such that a liquid to be treated flows through the cell units consecutively from above. Thus, they have found the possibility that hydraulic pressure may increase in the lower cell unit(s), whereby the liquid to be treated may intrude into the porous gas diffusion electrode. Also, the liquid to be treated may pass through the gas diffusion electrode to leak out to the exterior (into the gas phase). These phenomena may occur in the case where, for example, the hydraulic pressure of the liquid to be treated acting on the gas diffusion electrode is greater than the pressure of the gas phase which is in contact with the gas diffusion electrode (e.g., atmospheric pressure).

When intrusion of the liquid to be treated into the gas diffusion electrode (positive electrode) or leakage of the liquid to be treated occurs, the interface between the positive electrode and the gas phase (oxygen), i.e., points of oxygen reduction reaction, decreases, so that the output power of the fuel cell may decrease. Thus, even when a gas diffusion electrode is used, if reaction with oxygen in a gas phase is suppressed, high treatment efficiency or power generation efficiency may not be obtained.

Note that such problems are not limited to fuel cell systems that utilize a metabolic mechanism microorganisms. Similar problems could occur in any fuel cell system in which the negative electrode is in contact with a liquid and in which a gas diffusion electrode is used as the positive electrode.

Based on the above findings, the inventors have conducted further study. Thus, they have found a novel construction which can suppress increase in the hydraulic pressure of a liquid to be treated, between two cell units that are disposed one above the other along the vertical direction. As a result of this, intrusion of the liquid to be treated into the gas diffusion electrode or its leakage into the exterior due to hydraulic pressure can be suppressed, thus making it possible to enhance the treatment efficiency and power generation efficiency.

One implementation of the present invention is generally as follows.

A fuel cell system as one implementation of the present invention is a fuel cell system comprising: a plurality of cell units, including a first cell unit and a second cell unit located below the first cell unit along the vertical direction; and at least one connecting section including a first connecting section to connect the first cell unit and the second cell unit, the plurality of cell units each including: a treatment bath having a flow path through which a liquid to be treated is allowed to flow; a liquid intake port through which the liquid to be treated is supplied to the flow path and a liquid discharge port through which the liquid to be treated is discharged from the flow path; and at least one electrode cell, the at least one electrode cell including a negative electrode, a positive electrode at least a portion of which is a porous body, and an ion-permeable membrane disposed between the positive electrode and the negative electrode, the ion-permeable membrane being electrically non-conductive, the at least one electrode cell being disposed so that the negative electrode is in contact with the liquid to be treated flowing through the flow path, and that the positive electrode is exposed to a gas phase, and the first connecting section including: a connection path through which the liquid to be treated having been discharged from the liquid discharge port of the first cell unit is allowed to flow to the liquid intake port of the second cell unit; and a pneumatic adjustment section to suppress pneumatic fluctuations within the connection path that are associated with movements of the liquid to be treated.

The pneumatic adjustment section may have an orifice through which the connection path is allowed to communicate with an external space having a volume that is equal to or greater than the volume of an internal space of the connection path, for example.

The pneumatic adjustment section may include a sack communicating with an internal space of the connection path, the sack being capable of expansion and contraction, for example.

The pneumatic adjustment section may include a pressure regulating valve disposed in the connection path, for example.

An oxygen partial pressure of the external space may be set to 0.2 atm or less, for example.

A nitrogen partial pressure of the external space may be set to 0.8 atm or more, for example.

The first connecting section may further include a flow control section to control an amount of liquid to be treated that is supplied to the connection path, for example.

The flow control section may include a closable opening capable of opening and closing the connection path, for example.

A horizontal dimension of the flow path in the treatment bath may be equal to or greater than a vertical dimension of the flow path, for example.

The at least one electrode cell may comprise a first electrode cell and a second electrode cell; and the negative electrode of the first electrode cell and the negative electrode of the second electrode cell may be disposed so as to oppose each other via the flow path, for example.

The first electrode cell may extend from a first side face of the treatment bath toward interior of the treatment bath, for example, and the second electrode cell may extend from a second side face of the treatment bath toward the interior of the treatment bath, the second side face being opposite from the first side face; and the flow path in the treatment bath meanders in a horizontal plane, for example.

The plurality of cell units may include a further cell unit having a flow path through which the liquid to be treated is allowed to flow, the further cell unit being disposed below the second cell unit, for example; the at least one connecting section may comprise a further connecting section having a connection path connected to the flow path of the further cell unit, for example; and the fuel cell system may further comprise a bypass allowing the connection path of the first connecting section to communicate, not by way of the second cell unit, with the flow path of the further cell unit or the connection path of the further connecting section, and a path switcher capable of switching a path for the liquid to be treated flowing through the connection path of the first connecting section, between the flow path of the second cell unit and the bypass, for example.

Anaerobic microorganisms may be carried on the negative electrode, for example.

A fuel cell system module as one implementation of the present invention comprises: a cell unit and a connecting section capable of connecting to the cell unit, the cell unit including: a treatment bath having a flow path through which a liquid to be treated is allowed to flow; a liquid intake port through which the liquid to be treated is supplied to the flow path and a liquid discharge port through which the liquid to be treated is discharged from the flow path; and at least one electrode cell, the at least one electrode cell including a negative electrode, a positive electrode at least a portion of which is a porous body, and an ion-permeable membrane disposed between the positive electrode and the negative electrode, the ion-permeable membrane being electrically non-conductive, the at least one electrode cell being disposed so that the negative electrode is in contact with the liquid to be treated flowing through the flow path, and that the positive electrode is exposed to exterior of the treatment bath, the connecting section including: a connection path through which the liquid to be treated is allowed to flow; and a pneumatic adjustment section to suppress pneumatic fluctuations within the connection path that are associated with movements of the liquid to be treated, at least one of the liquid intake port and the liquid discharge port of the cell unit being capable of connecting to the connection path of the connecting section.

Hereinafter, embodiments of the fuel cell system according to the present invention will be described more specifically, with reference to the drawings.

(Embodiment 1)

FIG. 1 is a schematic diagram showing a fuel cell system 100 according to Embodiment 1.

The fuel cell system 100 of the present embodiment includes: a plurality of cell units, including a first cell unit 10A and a second cell unit 10B located below the first cell unit 10A along the vertical direction (direction of gravity); and a first connecting section 20A that connects the first cell unit 10A and the second cell unit 10B.

Each cell unit 10A, 10B includes a treatment bath 3 and an electrode cell 2.

The treatment bath 3 has in its interior a flow path 8 through which a liquid to be treated is allowed to flow. Moreover, the treatment bath 3 is provided with a liquid intake port 11A, 11B, through which the liquid to be treated is supplied to the flow path 8, and a liquid discharge port 13A, 13B, through which the liquid to be treated is discharged from the flow path 8.

The electrode cell 2 includes a positive electrode 5, a negative electrode 6, and an ion-permeable membrane 7 disposed between the positive electrode 5 and the negative electrode 6, the ion-permeable membrane 7 being electrically non-conductive. At least a portion of the positive electrode 5 is a porous body, such that the surface of the porous body is exposed to the exterior of the treatment bath 3 so as to be in contact with a gas phase (e.g., the atmospheric air). On the other hand, the negative electrode 6 is placed in contact with the liquid to be treated that flows through the flow path 8. The positive electrode 5 and the negative electrode 6 are connected to an external circuit 4.

The first connecting section 20A has a connection path 9 through which the liquid to be treated having been discharged from the liquid discharge port 13A of the first cell unit 10A is allowed to flow to the liquid intake port 11B of the second cell unit 10B. Thus, the liquid to be treated which has been discharged from the flow path 8 of the first cell unit 10A passes through the connection path 9 of the first connecting section 20A, and is supplied to the flow path 8 in the second cell unit 10B.

The first connecting section 20A is provided with a pneumatic adjustment section which suppresses pneumatic fluctuations within the connection path 9 that are associated with movements of the liquid to be treated in the connection path 9. Thus, when a liquid to be treated flows in the connection path 9, an increase in the pneumatic pressure of a gas phase G occurring in the connection path 9 can be suppressed. Specifically, in this example, an orifice 15 is provided as the pneumatic adjustment section, through which the connection path 9 is allowed to communicate with an external space having a volume that is equal to or greater than the volume of the internal space of the connection path 9. As used herein, the exterior may be the atmospheric space. The construction of the pneumatic adjustment section will be described later.

Note that the fuel cell system 100 at least includes two cell units 10A and 10B and a connecting section 20A connecting them, and may include any further cell unit(s) and connecting section(s). As will be described later, for example, three or more cell units that are disposed along the vertical direction may be provided. Among such cell units, a connecting section may respectively be provided between any two cell units that are disposed one above the other along the vertical direction.

The surface of the negative electrode 6 that comes in contact with the liquid to be treated (i.e., the face that is in contact with the internal space of the flow path 8) may carry anaerobic microorganisms. The anaerobic microorganisms may be suspended in the liquid to be treated that flows through the flow path 8 of the treatment bath 3. Alternatively, the surface of the negative electrode 6 may carry a catalytic material, instead of anaerobic microorganisms.

The negative electrode 6 is made of an electrically conductive material. Specifically, carbon materials may be used, e.g., a carbon sheet, carbon felt, carbon cloth, or a sheet of activated carbon. Moreover, the material of the negative electrode 6 may be a highly electrically conductive metal, e.g., aluminum, copper, stainless steel, nickel, or titanium.

The surface of the negative electrode 6 that comes in contact with the liquid to be treated may carry mediator molecules. In the case where a metabolic mechanism by anaerobic microorganisms is utilized for treating the liquid to be treated, electron exchange occurs within the microbial cells or with the final electron acceptor. When mediator molecules are introduced on the surface of the negative electrode 6, the mediator acts as a final electron acceptor, while also passing electrons to the negative electrode 6. As a result, the rate of oxidative degradation of the organic matter can be improved. Note that the mediator molecules may be suspended in the liquid to be treated that passes through the flow path 8 of the treatment bath 3.

The positive electrode 5 is made of an electrically conductive material, and at least a portion thereof is a porous body. The positive electrode 5 is made of e.g. a material which is porous or in the form of a woven fabric; and the entire electrode may be porous. The material of the positive electrode 5 may be a carbon material, e.g., a carbon sheet, carbon felt, carbon cloth, or a sheet of activated carbon. Moreover, the material of the positive electrode 5 may be a highly electrically conductive metal mesh, e.g., aluminum, copper, stainless steel, nickel, or titanium.

The ion-permeable membrane 7 is made of an electrically non-conductive material. As the ion-permeable membrane 7, specifically, a cation exchange membrane, an anion exchange membrane, a glass fiber membrane, a nonwoven fabric, or filter paper may be used.

The surface of the positive electrode 5 that is exposed to the exterior (abbreviate as "the exposed surface") is placed in contact with a gas phase containing oxygen. At least a portion of the exposed surface may be the surface of a porous body. Moreover, the exposed surface of the positive electrode 5 may carry an oxygen reduction catalyst. This promotes reaction (oxygen reduction reaction) between electrons and hydrogen ions that occur through oxidation of the organic matter at the negative electrode 6 and the oxygen contained in the gas phase which is in contact with the exposed surface of the positive electrode 5.

Next, the operation of the fuel cell system 100 will be described.

As the liquid to be treated, for example, a liquid containing a component to be treated, such as any organic matter or a nitrogen-containing compound (e.g., ammonia), can be used. Herein, an example of using an electrolytic solution containing organic matter will be described.

The liquid to be treated which has been supplied from the liquid intake port 11A of the first cell unit 10A into the treatment bath 3 flows through the flow path 8 in the treatment bath 3, to the liquid discharge port 13A. At this time, a part of the organic matter in the liquid to be treated undergoes oxidative degradation by the microorganisms that are carried on the surface of the negative electrode 6 of the electrode cell 2. At the surface of the negative electrode 6, hydrogen ions ($H^+$) and electrons ($e^-$) are generated through oxidation reaction. The hydrogen ions pass through the ion-permeable membrane 7 to be transported to the positive electrode 5. The electrons are released into the external circuit 4. On the other hand, at the surface of the positive electrode 5 (i.e., the surface that is exposed to the exterior of the treatment bath 3), the hydrogen ions having been transported from the negative electrode 6, the oxygen in the gas, and the electrons having moved from the negative electrode 6 via the external circuit 4 react with one another, thus causing a reduction reaction of oxygen. Through the above series of electrochemical reactions, electrical energy is retrieved as electrons move through the external circuit 4.

The liquid to be treated, whose organic matter has been partially degraded by the microorganisms through the above reaction, is discharged from the liquid discharge port 13A. Thereafter, it is supplied to the liquid intake port 11B of the second cell unit 10B, via the connection path 9 of the first connecting section 20A. A part of the organic matter remaining in the liquid to be treated is degraded in the flow path 8 within the treatment bath 3 of the second cell unit 10B. In this manner, the organic matter in the liquid to be treated is subjected to oxidative degradation through plural steps. By further increasing the number of cell units, the throughput and treatment capability can be further enhanced.

Figure 2:
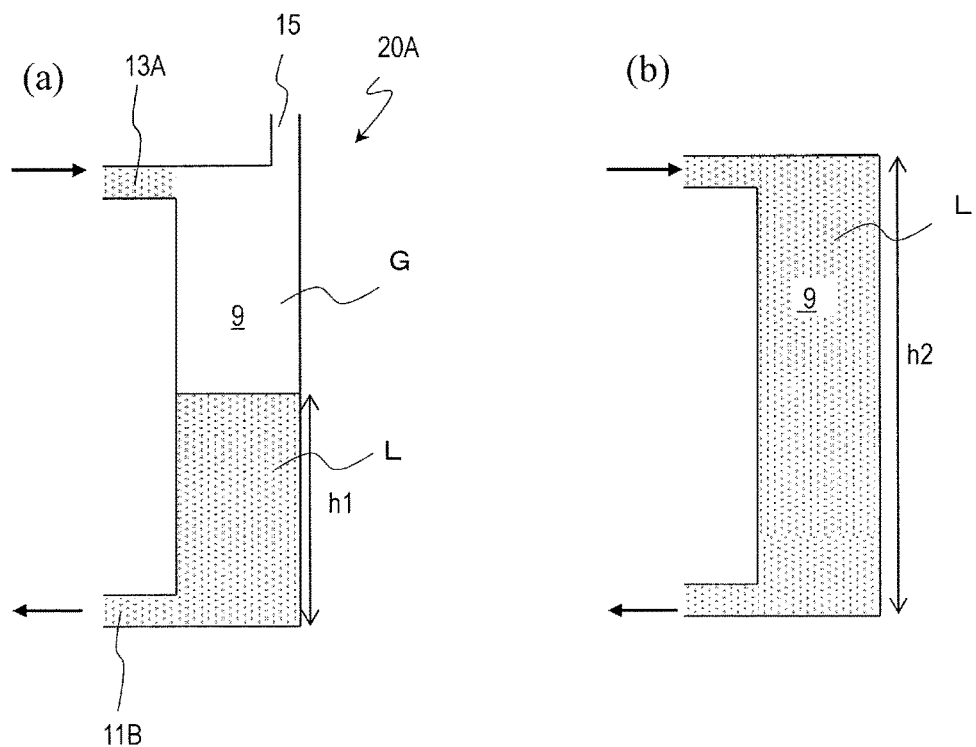
FIG. 2 (a) is a diagram describing a state in a connection path 9 during operation of the fuel cell system 100; and (b) is a diagram describing a state in the connection path 9 during operation of a fuel cell system according to Comparative Example.

In the present embodiment, the liquid to be treated is allowed to flow through the connection path 9 so that a gas phase G exists in a part of the connection path 9. Therefore, as schematically shown in FIG. 2(*a*), during the operation of the fuel cell system 100, the gas phase G and a liquid phase L associated with the liquid to be treated are created in the connection path 9 of the first connecting section 20A. The hydraulic pressure at the interface between the gas phase G and the liquid phase L equals the pneumatic pressure of the gas phase G. As described earlier, the first connecting section 20A is structured so as to suppress an increase in the pneumatic pressure of the gas phase G that is caused by the incoming liquid to be treated. Thus, the hydraulic pressure of any liquid to be treated that is located below the gas phase G can be reduced.

In this example, the connection path 9 has the orifice 15, which opens to the atmospheric space, thus allowing the pneumatic pressure of the gas phase G to lower to e.g. near the atmospheric pressure. In this case, the hydraulic pressure at the interface between the gas phase G and the liquid phase L (water surface) in the connection path 9 becomes substantially equal to the atmospheric pressure. Therefore, the hydraulic pressure of the liquid to be treated flowing through the flow path 8 of the second cell unit 10B increases in proportion to the depth h1 of the flow path 8 of the second cell unit 10B relative to the water surface in the connection path 9 (i.e., the interface between the liquid phase L and the gas phase G). The depth h1 is less than the height of the connection path 9. As a result of this, the liquid to be treated is restrained from intruding into the electrode cell 2 due to an increased hydraulic pressure in the flow path 8 of the second cell unit 10B. Also, in the case where a greater number of cell units are provided along the vertical direction for enhanced treatment capability, the depth h1 of the flow path of any lower cell unit, as taken relative to the water surface, can be kept to less than the height of the connection path 9. Thus, in each of the lower plurality of cell units, intrusion of the liquid to be treated into the positive electrode 5 or its leakage into the external gas phase as caused by an increased hydraulic pressure of the liquid to be treated can be suppressed.

In comparison thereto, an example (Comparative Example) where the connection path 9 lacks a pneumatic adjustment section will be described with reference to FIG. 2(*b*). In the fuel cell system according to Comparative Example shown in FIG. 2(*b*), the hydraulic pressure increases in proportion to the depth h2 of the flow path of a lower cell unit relative to the water surface of the liquid to be treated in the flow path of an upper cell unit. As a greater number of cell units are provided along the vertical direction for enhanced treatment capability, the hydraulic pressure acting on the lower cell unit will increase in proportion to its depth relative to the water surface of the cell unit that is at the highest position. Although not shown, when a gas phase occurs in the connection path 9 during system operation, there is no way to suppress the increase in the pneumatic pressure of the gas phase, thus making it difficult to restrain the hydraulic pressure within the lower cell unit from increasing. As a result, in the lower cell unit, the hydraulic pressure of the liquid to be treated becomes very large, possibly resulting in the problems of intrusion of the liquid to be treated into the porous body of the positive electrode 5 of the electrode cell 2, leakage to the exterior, and the like.

Thus, in the fuel cell system 100 of the present embodiment, the first and second cell units 10A and 10B are disposed along the vertical direction via the first connecting section 20A having a pneumatic adjustment section, with gas diffusion electrodes being used as the positive electrodes 5 in the first and second cell units 10A and 10B. Use of the gas diffusion electrodes permits highly efficient oxidation of the organic matter or the like in the liquid to be treated and highly efficient power generation. Moreover, since the plurality of cell units 10A and 10B can be disposed along the vertical direction, the treatment capability for the liquid to be treated and the generation output can be enhanced, while suppressing an increase in the footprint of the fuel cell system 100. Furthermore, as has been described with reference to FIG. 2, increase in the hydraulic pressure of the liquid to be treated that flows in the flow path is also suppressed in the lower cell unit that is disposed along the vertical direction. Therefore, any decrease in the generation output that is caused by intrusion of the liquid to be treated into the positive electrode 5 and its leakage to the exterior can be suppressed. Thus, there is realized a highly efficient fuel cell system 100 that permits large-scale implementation.

<Construction of the Pneumatic Adjustment Section>

Next, the construction of a pneumatic adjustment section to be provided in the first connecting section 20A according to the present embodiment will be described.

In the first connecting section 20A shown in FIG. 1, an orifice 15 which allows the connection path 9 to communicate with an external space, e.g., the atmospheric space, is provided as the pneumatic adjustment section. Although there is no particular limitation as to the position of the orifice 15, when it is disposed at an upper position on the connection path 9 (an upper position along the vertical direction), it better allows the gas phase G created in the connection path 9 to communicate with the external space. For example, the orifice 15 may be disposed on an upper face, or an upper portion of a side face, of the first connecting section 20A. The external space for communication through the orifice 15 is not limited to the atmospheric space. For example, the connection path 9 may be arranged so as to communicate with the interior of a housing which accommodates the entire fuel cell system 100 or each cell unit.

The construction of the pneumatic adjustment section according to the present embodiment is not limited to a construction that allows the connection path 9 to communicate with the external space. FIGS. 3(a) and (b) are cross-sectional views illustrating examples of the first connecting section 20A having other pneumatic adjustment sections.

As shown in FIG. 3(a), a sack 16 which is capable of expansion and contraction may be provided as the pneumatic adjustment section, in communication with the internal space of the connection path 9. The sack 16 is disposed so as to be in contact with a gas phase G that is created in the connection path 9 during system operation. For example, it may be disposed at an upper position on the first connecting section 20A. The sack 16 is made of an expandable material. As the expandable material, for example, synthetic rubbers such as natural rubber, isoprene rubber, and styrene-butadiene rubber; thermoplastic elastomers of styrene-type, olefin-type, or other types; and the like can be used. This allows the volume of the gas phase G created in the connection path 9 to be increased by the space which is obtained by expanding the sack 16. As a result, an increase in the pneumatic pressure of the gas phase G that is caused by the incoming liquid to be treated can be suppressed.

Alternatively, as shown in FIG. 3(b), a pressure regulating valve 17 may be provided in the connection path 9 as a gas adjustment section. The pressure regulating valve 17 is arranged so as to suppress pneumatic fluctuations in a gas phase G created in the connection path 9. Thus, an increase in the pneumatic pressure of the gas phase G that is caused by the incoming liquid to be treated can be suppressed.

<Structure for Physically Shutting the Liquid to be Treated>

The fuel cell system 100 of the present embodiment may be arranged so that, during operation, the liquid to be treated that flows through the flow path 8 in the first cell unit 10A is physically shut by a gas phase G in the connection path 9 from the liquid to be treated that flows through the flow path 8 in the second cell unit 10B.

In order to better ensure that the liquid to be treated is physically shut during operation of the fuel cell system 100, the vertical dimension (height) of the first connecting section 20A may be sufficiently increased to permit a free-fall based movement of the liquid to be treated within the connection path 9, for example. In this case, for example, it may be applicable to appropriately adjust the flow rate of the liquid to be treated, a cross-sectional area which is perpendicular to the direction of flow in the connection path 9, or the like, so as to prevent the entire connection path 9 from being filled with the liquid to be treated (liquid phase L).

Alternatively, the first connecting section 20A may have a flow rate control section which controls the amount of liquid to be treated that is supplied to the connection path 9. The flow control section may be arranged to stop supply of the liquid to be treated (that is, to shut the liquid for treatment from flowing through). For example, as shown in FIG. 4, the first connecting section 20A may have a closable opening 21 with which the connection path 9 can be opened or closed. The closable opening 21 may be arranged so that, when the closable opening 21 is closed, the liquid to be treated is shut from flowing through the flow path 8 of the first cell unit 10A to the flow path 8 of the second cell unit 10B, and when the closable opening 21 is opened, the liquid to be treated is allowed to flow through. As the flow control section, for example, a solenoid valve, a waterwheel, a water bucket dump mechanism, or the like can be used. As a result, the liquid to be treated flowing through the cell units 10A and 10B can be physically shut with greater certainty.

An operation in which the liquid to be treated within each cell unit 10A, 10B is physically shut provides the following advantages. Since a gas phase G is surely created in the connection path 9, it is possible to suppress the increase in the hydraulic pressure of the liquid to be treated by adjusting the pneumatic pressure of the gas phase G. Moreover, shutting the liquid to be treated also shuts an electrical connection between the two cell units 10A and 10B that is created via the liquid to be treated, whereby each cell unit 10A, 10B can be regarded as a single independent battery cell. As a result, the external circuits 4 of the cell units 10A and 10B can be placed in series or parallel connection for a battery system that provides the maximum output power.

<Other Constructions for the Cell Units and Connecting Section>

In the cell units 10A and 10B according to the present embodiment, a horizontal dimension of the flow path 8 formed in the treatment bath 3 may be equal to or greater than its vertical dimension. Examples of the horizontal dimension include the length and the maximum width of the flow path 8 in each treatment bath 3. The vertical dimension means the height of the flow path 8. With this construction, the vertical dimension of the flow path 8 can be kept small, whereby the hydraulic pressure acting on each cell unit can be kept lower. In the illustrated example, the entire internal space of the treatment bath 3 corresponds to the flow path 8; therefore, the aforementioned effect is obtained so long as a horizontal dimension of the internal space of the treatment bath 3 is equal to or greater than its vertical dimension.

The flow path 8 in the treatment bath 3 may be structured so that creation of a gas phase is restrained when the liquid to be treated is allowed to flow through. As a result, when treating the liquid to be treated by utilizing anaerobic microorganisms, for example, contact between the liquid to be treated and the air (oxygen) can be reduced, whereby proliferation of the aerobic microorganisms in the treatment bath 3 can be suppressed. In order to restrain a gas phase from being created in the flow path 8, in each cell unit 10A, 10B, the liquid intake port 11A, 11B may be provided below the liquid discharge port 11A, 11B along the vertical direction.

The example shown in FIG. 1 is arranged so that the liquid to be treated flows through mainly in a horizontal plane (i.e., a plane which is perpendicular to the direction of gravity) within the treatment baths 3 of the first and second cell units 10A and 10B, and that the liquid to be treated flows through mainly along the vertical direction within the first connecting section 20A. Moreover, when viewed from vertically above, the directions of flow of the liquid to be treated in the first and second cell units 10A are made opposite to each other. Note that the directions of flow of the liquid to be treated are not limited to this example. For example, the flow path 8 in the treatment bath 3 may be inclined with respect to the horizontal plane.

<Construction of a Fuel Cell System Including Three or More Cell Units>

As described above, the fuel cell system according to the present embodiment may include three or more cell units that are disposed along the vertical direction. Among such cell units, a connecting section may respectively be provided between any two cell units that are disposed one above the other along the vertical direction.

FIG. 5 is a cross-sectional view illustrating an exemplary fuel cell system 200 including three or more cell units. In FIG. 5, similar constituent elements to those in the fuel cell system 100 shown in FIG. 1 will be denoted by like reference numerals, and the description thereof will be omitted.

In the fuel cell system 200, from above along the vertical direction, a first cell unit 10A, a second cell unit 10B, a third cell unit 10C, a fourth cell unit 10D, and a fifth cell unit 10E are disposed. Although not shown, each cell unit is connected to an external circuit. Although five cell units are provided herein, the number of cell units is not limited thereto. The first and second cell units 10A and 10B are connected by a first connecting section 20A. Similarly, the second and third cell units 10B and 10C are connected by a second connecting section 20B; the third and fourth cell units 10C and 10D are connected by a third connecting section 20C; and the fourth and fifth cell units 10D and 10E are connected by a fourth connecting section 20D. Each of the cell units 10A to 10E may be similar in construction to the first and second cell units 10A and 10B described above with reference to FIG. 1. Each of the connecting sections 20A to 20D may be similar in construction to the first connecting section 20A described above with reference to FIG. 1.

With the fuel cell system 200, similarly to the fuel cell system 100 shown in FIG. 1, the throughput of the liquid to be treated and the generation output can be improved through large-scale implementation, while ensuring a high efficiency. By increasing the number of cell units, the fuel cell system 200 of a desired scale can be constructed.

The fuel cell system 200 may further include a bypass 23A which causes the liquid for treatment that flows in the flow path 8 in the first cell unit 10A to not pass through one or more cell units disposed below it, but to be transported to another cell unit disposed further below. Although not shown, a path switcher may be provided that switches the path for the liquid to be treated, which flows through the connection path 9 of the first connecting section 20A, between the flow path 8 of the second cell unit 10B and the bypass 23A. Even if one of the cell units has a problem, for example, this will make it possible to stop supply of the liquid to be treated to that cell unit, thus allowing the fuel cell system 200 to operate by exclusively using the other cell units. Thus, maintenance or replacement of the cell units is facilitated.

As shown in FIG. 5, the bypass 23A may be provided so as to connect the connection path 9 of the first connecting section 20A and the connection path 9 of the second connecting section 20B not by way of the second cell unit 10B. Alternatively, the bypass 23A may be provided so as to connect the connection path 9 of the first connecting section 20A to the flow path 8 of the third cell unit 10C not by way of the second cell unit 10B and the second connecting section 20B. Similarly, a bypass 23B may be provided that connects the connection path 9 of the second connecting section 20B to the connection path 9 of the third connecting section 20C or the flow path 8 of the fourth cell unit 10D at least not by way of the third cell unit 10C. Moreover, a bypass 23C may be provided that connects the connection path 9 of the third connecting section 20C to the connection path 9 of the fourth connecting section 20D or the flow path 8 of the fifth cell unit 10E at least not by way of the fourth cell unit 10D.

Note that the bypass 23A may be disposed so as to connect the first connecting section 20A either to a cell unit 10C to 10E being disposed further below the second cell unit 10B, or to a connecting section 20B to 20D which is connected to that cell unit. For example, it may be arranged so as to cause the liquid for treatment to not pass through a number of cell units including the second cell unit 10B, but to be transported to a cell unit that is disposed further below. For example, a bypass may be provided that connects the first connecting section 20A to the third connecting section 20C not by way of the second and third cell units 10B and 10C. Providing such a bypass for the fuel cell system 200 attains an advantage of reduced bypass length than does the bypass 23A.

The fuel cell system 200 shown in FIG. 5 is arranged so that the liquid to be treated consecutively flows through from the flow path 8 in the cell unit 10A, which is located uppermost along the vertical direction, to the flow path 8 in the cell unit 10E, which is located lowermost. So long as some of the plurality of cell units composing the fuel cell system are disposed along the vertical direction, it is not necessary that all cell units are consecutively disposed along the vertical direction. For example, a number of cell unit groups may be created, in each of which a plurality of cell units are disposed along the vertical direction, and such cell unit groups may be disposed along a horizontal direction(s) to construct a fuel cell system. Alternatively, a number of cell unit groups may be created, in each of which a plurality of cell units are disposed in parallel along a horizontal direction(s), and such cell unit groups may be disposed along the vertical direction.

Furthermore, it suffices if at least two of the plurality of cell units have a construction similar to that of the cell units 10A and 10B described above and are connected by a connecting section having a similar construction to that of the first connecting section 20A. Therefore, for example, it is not necessary for all of the connecting sections coupling the cell units to be complete with a pneumatic adjustment section; the effect of suppressing increase in the hydraulic pressure can be obtained by providing a pneumatic adjustment section in at least one connecting section.

(Embodiment 2)

Embodiment 2 of the fuel cell system according to the present invention differs from the fuel cell system 100 of Embodiment 1 shown in FIG. 1 in that the oxygen partial pressure of the gas phase G in the connection path 9 is kept to 0.2 atm or less.

FIG. 6 is a cross-sectional view illustrating an exemplary fuel cell system 300 of the present embodiment. Similar constituent elements to those in the fuel cell system 100 shown in FIG. 1 will be denoted by like reference numerals, and the description thereof will be omitted.

The fuel cell system 300 is accommodated inside a housing 25. The housing 25 is hermetically sealed. The oxygen partial pressure inside the housing 25 is adjusted to 0.2 atm or less. The nitrogen partial pressure inside the housing 25 may be kept to 0.8 atm or more in order to ensure that the oxygen partial pressure is 0.2 atm or less. Moreover, in each of the cell units 10A and 10B in the fuel cell system 300, a metabolic mechanism by anaerobic microorganisms is utilized, for example, to effect degradation of a substance to be treated in the liquid for treatment, as well as power generation.

In the fuel cell system 300, the connection path 9 of the first connecting section 20A may communicate with the internal space of the housing 25 through an orifice 15. This provides an effect of suppressing dissolution of oxygen in the connection path 9, as is described below.

As was described earlier, when the fuel cell system 300 is operated, a gas phase G and a liquid phase L are created in the connection path 9. The interface between the gas phase G and the liquid phase L has a hydraulic pressure which is equal to the pneumatic pressure of the gas phase G. Via this interface, oxygen in the gas phase G is dissolved into the liquid to be treated. According to Henry's law, as the oxygen partial pressure in the gas phase G increases, an increased amount of oxygen is dissolved in the liquid to be treated that is in contact with the gas phase G. As an increased amount of oxygen is dissolved in the liquid to be treated, the aerobic microorganisms in the liquid to be treated will proliferate and cover the surface of the negative electrode 6, thereby lowering the battery output. In the present embodiment, the oxygen partial pressure of the gas phase G can be kept to 0.2 atm or less, which is smaller than the oxygen partial pressure within the atmospheric air, i.e., 0.21 atm; thus, dissolution of oxygen via the interface between the gas phase G and the liquid to be treated can be suppressed.

Note that the above effect is obtained so long as the oxygen partial pressure of the external space that may potentially communicate with the connection path 9 is 0.2 atm or less. For example, the first connecting section 20A may have a pressure regulating portion, such as a pressure regulating valve which is provided on the connection path 9, the pressure regulating portion being arranged to locally control the oxygen partial pressure of the gas phase G to 0.2 atm or less. In this case, the fuel cell system 300 does not need to be enclosed by the housing 25, but may be placed in the atmospheric space.

In the fuel cell system 300, the porous positive electrode 5 of each cell unit 10A, 10B is in contact with the internal space of the housing 25, i.e., a gas phase with an oxygen partial pressure of 0.2 atm or less. This provides an effect of suppressing dissolution of oxygen in the flow path 8, as is described below.

At the positive electrode 5, a reaction occurs between the oxygen which is present in the gas phase that is in contact with the positive electrode 5 and the hydrogen and electrons having moved from the negative electrode 6. At this time, if the oxygen amount is excessive, the oxygen which was not used in the reaction may possibly pass through the porous positive electrode 5 to reach the negative electrode 6. In the case of utilizing anaerobic microorganisms to treat the liquid to be treated, if the excess oxygen reaches the negative electrode 6, the aerobic microorganisms may possibly proliferate within the liquid to be treated, thus lowering the output power. On the other hand, according to the present embodiment, the oxygen partial pressure of the gas phase that is in contact with the surface of the positive electrode 5 is kept to 0.2 atm or less. This reduces the amount of oxygen passing through the porous positive electrode 5 to reach the negative electrode 6, whereby an output power deterioration due to proliferation of the aerobic microorganisms is more effectively suppressed.

Note that the aforementioned effect is obtained when the oxygen partial pressure of the gas phase that is in contact with the positive electrode 5 is 0.2 atm or less. Therefore, it is not necessary for the entire fuel cell system 300 to be enclosed by the housing 25; for example, only each cell unit 10A, 10B may be placed within a space with low oxygen partial pressure.

However, as shown in FIG. 6, by allowing the positive electrode 5 of each cell unit 10A, 10B in the fuel cell system 300 and the connection path 9 of the first connecting section 20A to be in contact with a common space with low oxygen partial pressure (which herein is the internal space of the housing 25), dissolution into the liquid to be treated of oxygen occurring at both the connection path 9 and the flow path 8 can be suppressed. Thus, an output power deterioration of the fuel cell system 300 due to oxygen can be suppressed more effectively.

In the fuel cell system 300 of the present embodiment, too, a closable opening for opening and closing the connection path 9 may be provided, similarly to Embodiment 1. Moreover, as is illustrated in FIG. 5, a construction in which three or more cell units are disposed along the vertical direction may be adopted.

(Embodiment 3)

Embodiment 3 of the fuel cell system according to the present invention differs from the fuel cell system 100 of Embodiment 1 shown in FIG. 1 in that each cell unit 10A, 10B includes a plurality of electrode cells.

FIG. 7 is a cross-sectional view illustrating an exemplary fuel cell system 400 according to the present embodiment. Similar constituent elements to those in the fuel cell system 100 shown in FIG. 1 will be denoted by like reference numerals, and the description thereof will be omitted.

In the fuel cell system 400, each cell unit 10A, 10B includes a first electrode cell 2U and a second electrode cell 2L. The negative electrode 6 of the first electrode cell 2U and the negative electrode 6 of the second electrode cell 2L are disposed so as to oppose each other via the flow path 8. As a result of this, the area of the positive electrode 5 and the negative electrode 6 per volume of each cell unit 10A, 10B can be increased, thus improving the battery output of each cell unit 10A, 10B.

In the example shown in FIG. 7, the first electrode cell 2U is disposed on the upper face of the treatment bath 3 of each cell unit 10A, 10B, and the second electrode cell 2L is disposed on the bottom face of the treatment bath 3, the flow path 8 being formed between the electrode cells 2U and 2L. The liquid to be treated that flows in the flow path 8 is in contact with the surface of the negative electrodes 6 of the electrode cells 2U and 2L.

Note that the first and second electrode cells 2U and 2L may respectively be disposed on opposing side faces of the treatment bath 3. Moreover, each cell unit 10A, 10B may include three or more electrode cells.

Figure 8:
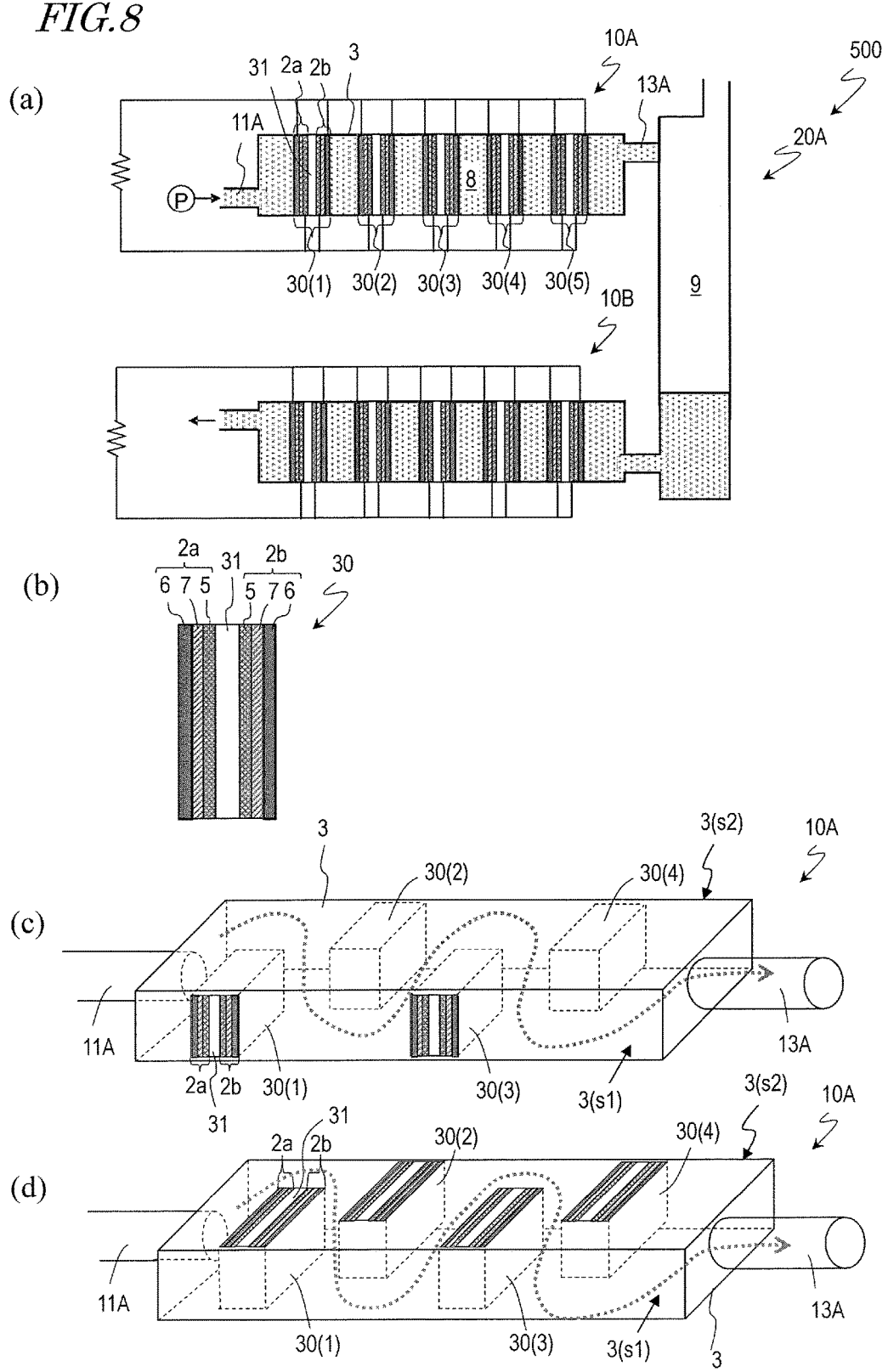
FIG. 8 (a) is a schematic cross-sectional view of another fuel cell system 500 according to the third embodiment; (b) is an enlarged cross-sectional view illustrating an exemplary electrode cell section 30 in the fuel cell system 500; and (c) and (d) are perspective views each illustrating an exemplary cell unit 10A in the fuel cell system 500.

FIG. 8(*a*) is a cross-sectional view illustrating another exemplary fuel cell system 500 of the present embodiment. FIG. 8(*b*) is an enlarged cross-sectional view of an electrode cell section 30 in the fuel cell system 500. FIGS. 8(*c*) and (*d*) are perspective views each illustrating an exemplary cell unit 10A in the fuel cell system 500.

Each cell unit 10A, 10B in the fuel cell system 500 includes a plurality of electrode cell sections 30(1) to 30(4). The number of electrode cell sections is not particularly limited, and may be arbitrarily chosen.

As shown in FIG. 8(*b*), each of the electrode cell sections 30(1) to 30(4) includes a gap (air pocket) 31, which communicates with an external space of the treatment bath 3, and first and second electrode cells 2a and 2b disposed on both sides thereof. The positive electrode 5 of the electrode cell 2a and the positive electrode 5 of the electrode cell 2b are disposed so as to oppose each other via the gap 31. Moreover, the electrode cells 2a and 2b are disposed so that the positive electrode 5 is exposed to the gas phase (gap 31) and that the negative electrode 6 is in contact with the liquid to be treated that flows in the flow path 8 within the treatment bath 3.

As shown in FIG. 8(*c*), some electrode cell sections 30(1) and 30(3) among these electrode cell sections extend from a first side face 3(s1) of the treatment bath 3 toward the interior of the treatment bath 3, while the other electrode cell sections 30(2) and 30(4) extend from a second side face 3(s2) of the treatment bath 3, opposite from the first side face 3(s1), toward the interior of the treatment bath 3. The gap 31 of each electrode cell section communicates with the exterior at the first side face 3(s1) or the second side face 3(s2) of the treatment bath 3. Alternatively, as shown in FIG. 8(*d*), the gap 31 of each electrode cell section may communicate with the exterior at the upper face (or the bottom face) of the treatment bath 3.

The electrode cell sections 30(1) and 30(3) extending from the first side face 3(s1) and the electrode cell sections 30(2) and 30(4) extending from the second side face 3(s2) may be disposed in alternating fashion between the liquid intake port 11A and the liquid discharge port 13A in the treatment bath 3. On the horizontal plane, each of the electrode cell sections 30(1) to 30(4) may extend so as to be substantially perpendicular to a straight line connecting the liquid intake port 11A of the liquid discharge port 13A of the treatment bath 3. The liquid to be treated may flow through in between the electrode cell sections 30(1) to 30(4) within the internal space of the treatment bath 3. In this case, the flow path 8 of the treatment bath 3 may meander in the horizontal plane.

With the fuel cell system 500, the area of the positive electrode 5 and the negative electrode 6 per volume of each cell unit 10A, 10B can be increased, thus improving the battery output of each cell unit 10A, 10B.

Although the example shown in FIG. 8 illustrates that two electrode cells 2a and 2b are disposed on both sides of the gap 31 in the electrode cell sections 30(1) to (4), it suffices if at least one electrode cell is disposed in contact with the gap 31.

Note that the aforementioned effect is obtained so long as the treatment bath 3 includes at least two electrode cells, where one electrode cell (e.g., the electrode cell 2b of the electrode cell section 30(1)) extends from the first side face 3(s1) of the treatment bath 3 toward the interior of the treatment bath 3 and the other electrode cell (e.g., the electrode cell 2a of the electrode cell section 30(2)) extends from the second side face 3(s2), opposite from the first side face of the treatment bath 3, toward the interior of the treatment bath 3.

In the fuel cell systems 400 and 500 according to the present embodiment, too, a closable opening for opening and closing the connection path 9 may be provided, similarly to Embodiments 1 and 2. Moreover, a construction in which three or more cell units are disposed along the vertical direction may be adopted. Furthermore, the fuel cell system 400, 500 may be disposed inside a housing 25.

(Embodiment 4)

Embodiment 4 according to the present invention is a module (hereinafter referred to as a "fuel cell system module") from which the aforementioned fuel cell system can be constructed.

Figure 9:
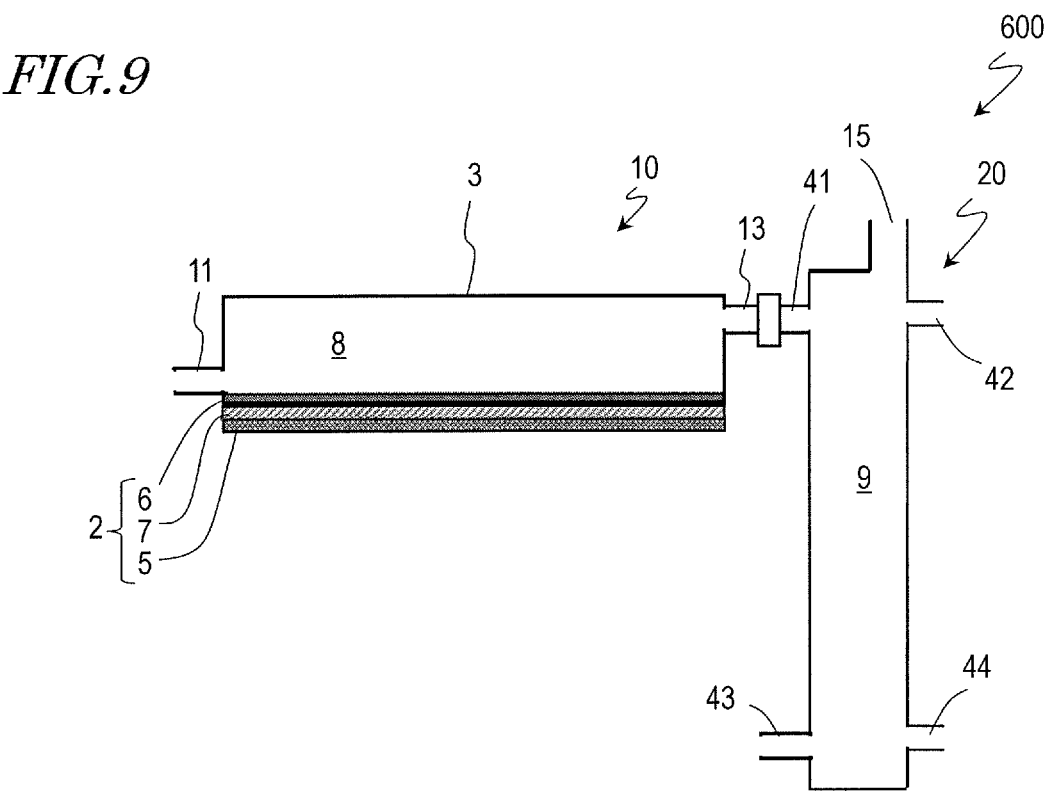
FIG. 9 A schematic cross-sectional view of a fuel cell system module 600 according to a fourth embodiment.

FIG. 9 is a cross-sectional view illustrating an exemplary fuel cell system module 600 according to the present embodiment. The fuel cell system module 600 includes a cell unit 10 and a connecting section 20 capable of connecting to the cell unit 10. The cell unit 10 and the connecting section 20 may be similar in construction to the cell units 10A and 10B and the first connecting section 20A, respectively, of Embodiment 1 above.

The cell unit 10 includes a treatment bath 3 having a flow path 8 through which a liquid to be treated is allowed to flow, a liquid intake port 11 through which the liquid to be treated is supplied to the flow path 8, a liquid discharge port 13 through which the liquid to be treated is discharged from the flow path 8, and at least one electrode cell 2. The electrode cell 2 includes a negative electrode 6, a positive electrode 5 at least a portion of which is a porous body, and an ion-permeable membrane 7 disposed between the positive electrode 5 and the negative electrode 6, the ion-permeable membrane 7 being electrically non-conductive. The electrode cell 2 is arranged so that the negative electrode 6 is in contact with the liquid to be treated flowing through the flow path 8 and that the positive electrode 5 is exposed to a gas phase outside of the treatment bath 3.

The connecting section 20 includes a connection path 9 through which the liquid to be treated is allowed to flow and a pneumatic adjustment section which suppresses pneumatic fluctuations within the connection path that are associated with movements of the liquid to be treated. The pneumatic adjustment section may be an orifice 15 which permits communication between the external space and the connection path 9, as shown in the figure. The external space may be an external space having a volume that is equal to or greater than the volume of the internal space of the connection path 9, such as the atmospheric space. Alternatively, as has been described earlier with reference to FIG. 3, the pneumatic adjustment section may be a sack which is capable of expansion and contraction, or a pressure regulating valve.

In the present embodiment, at least one of the liquid intake port 11 and the liquid discharge port 13 of the cell unit 10 is arranged so as to be capable of connecting to the connection path 9 of the connecting section 20.

The connecting section 20 may have an inlet 41 through which the liquid to be treated is supplied to connection path 9 and an outlet 43 through which the liquid to be treated is discharged from the connection path 9. The liquid discharge port 13 of the cell unit 10 may be capable of connecting to the inlet 41 of the connecting section 20, and the liquid intake port of the cell unit 10 may be capable of connecting to the outlet 43 of the connecting section 20.

Moreover, the number of cell units in the fuel cell system module of the present embodiment does not need to be one. For example, the fuel cell system module may include two cell units and one connecting section 20, such that the respective liquid discharge ports 13 of the two cell units 10 are capable of connecting to the connection path 9 of the single connecting section 20.

Moreover, the number of connecting sections in the fuel cell system module of the present embodiment does not need to be one. For example, the fuel cell system module may include one cell unit and two connecting sections 20, such that the liquid intake port 11 of the single cell unit 10 is capable of connecting to the connection path 9 of one of the two connecting sections 20 and that the liquid discharge port 13 of the single cell unit 10 is capable of connecting to the connection path 9 of the other one of the two connecting sections 20.

By connecting together a plurality of fuel cell system modules 600, a fuel cell system having a desired treatment capability and output power can be easily constructed. For example, the fuel cell systems 100 to 500 according to the above-described embodiments can be constructed by using the fuel cell system modules 600.

The connecting section 20 may further include another inlet 42 and another outlet 44. In the case of constructing a fuel cell system by disposing three or more fuel cell system modules 600 along the vertical direction, it would also be possible to create a bypass which connects the other outlet 44 of the connecting section 20 to the other inlet 42 of a lower connecting section 20. As shown in the figure, the inlets 41 and 42 of the connecting section 20 may be disposed above the outlets 44 and 45 along the vertical direction when constructing a fuel cell system, for example.

In the example shown in FIG. 9, the cell unit 10 and the connecting section 20 are similar in construction to the cell unit 10A and the first connecting section 20A shown in FIG. 1; however, their construction may be similar to those in other embodiments. For example, the connecting section 20 may include other pneumatic adjustment sections as shown in FIG. 3, or include a flow rate control section such as a solenoid valve. Moreover, the cell unit 10 may include a plurality of electrode cells as illustrated in FIG. 7 and FIG. 8.

INDUSTRIAL APPLICABILITY

In one implementation, the present invention is broadly applicable to a fuel cell system which utilizes a liquid containing a substance to be treated, such as organic matter or a nitrogen-containing compound, e.g., wastewater emanating from plants or the like in various industries, organic wastewater such as sewage sludge, and so on. In particular, it is suitably used in microbial fuel cells that utilize a metabolic mechanism of microorganisms.

REFERENCE SIGNS LIST 2, 2a, 2b, 2U, 2L electrode cell
3 treatment bath
4 external circuit
5 positive electrode
6 negative electrode
7 ion-permeable membrane
8 flow path
9 connection path
10, 10A, 10B, 10C, 10D, 10E cell unit
11, 11A, 11B liquid intake port
13, 13A, 13B liquid discharge port
15 orifice
16 sack
17 pressure regulating valve
20, 20A, 20B, 20C, 20D connecting section
21 closable opening
23, 23A, 23B, 23C bypass
25 housing
30, 30(1), 30(2), 30(3), 30(4) electrode cell section
31 gap
41, 42 inlet
43, 44 outlet
100, 200, 300, 400, 500 fuel cell system
600 fuel cell system module
G gas phase
L liquid phase

The invention claimed is:

1. A fuel cell system comprising:
a plurality of cell units, including a first cell unit and a second cell unit located below the first cell unit along a vertical direction; and
at least one connecting section including a first connecting section to connect the first cell unit and the second cell unit,
each of the plurality of cell units including:
a treatment bath having a flow path through which a liquid to be treated is allowed to flow;
a liquid intake port through which the liquid to be treated is supplied to the flow path and a liquid discharge port through which the liquid to be treated is discharged from the flow path; and
at least one electrode cell, the at least one electrode cell including a negative electrode, a positive electrode at least a portion of which is a porous body, and an ion-permeable membrane disposed between the positive electrode and the negative electrode, the ion-permeable membrane being electrically nonconductive, the at least one electrode cell being disposed so that the negative electrode is in contact with the liquid to be treated flowing through the flow path, and that the positive electrode is exposed to a gas phase, and
the first connecting section including:
an input connected to the liquid discharge port of the first cell unit;
an output connected to the liquid intake port of the second cell unit;

a connection path through which the liquid to be treated having been discharged from the liquid discharge port of the first cell unit and through the input of the first connecting section is allowed to flow through the output of the first connecting section and to the liquid intake port of the second cell unit; and a pneumatic adjustment section to suppress pneumatic fluctuations within the connection path that are associated with movements of the liquid to be treated, wherein the pneumatic adjustment section has an orifice different than the input and the output of the first connecting section through which the connection path is allowed to communicate with an external space different than the treatment bath of the first cell unit and the treatment bath of the second cell unit, the external space having a volume that is equal to or greater than the volume of an internal space of the connection path.

2. The fuel cell system of claim 1, wherein an oxygen partial pressure of the external space is set to 0.2 atm or less.

3. The fuel cell system of claim 1, wherein a nitrogen partial pressure of the external space is set to 0.8 atm or more.

4. The fuel cell system of claim 1, wherein the first connecting section further includes a flow control section to control an amount of the liquid to be treated that is supplied to the connection path.

5. The fuel cell system of claim 4, wherein the flow control section includes a closable opening capable of opening and closing the connection path.

6. The fuel cell system of claim 1, wherein, in the each of the plurality of cell units, a horizontal dimension of the flow path in the treatment bath is equal to or greater than a vertical dimension of the flow path.

7. The fuel cell system of claim 1, wherein,
the at least one electrode cell comprises a first electrode cell and a second electrode cell; and
the negative electrode of the first electrode cell and the negative electrode of the second electrode cell are disposed so as to oppose each other via the flow path.

8. The fuel cell system of claim 7, wherein,
the first electrode cell extends from a first side face of the treatment bath toward an interior of the treatment bath, and the second electrode cell extends from a second side face of the treatment bath toward the interior of the treatment bath, the second side face being opposite from the first side face; and
the flow path in the treatment bath meanders in a horizontal plane.

9. The fuel cell system of claim 1, wherein,
the plurality of cell units include a further cell unit having a flow path through which the liquid to be treated is allowed to flow, the further cell unit being disposed below the second cell unit;
the at least one connecting section comprises a further connecting section having a connection path connected to the flow path of the further cell unit; and
the fuel cell system further comprises
a bypass allowing the connection path of the first connecting section to communicate, not by way of the second cell unit, with the flow path of the further cell unit or the connection path of the further connecting section, and
a path switcher capable of switching a path for the liquid to be treated flowing through the connection path of the first connecting section, between the flow path of the second cell unit and the bypass.

10. The fuel cell system of claim 1, wherein, in the each of the plurality of cell units, anaerobic microorganisms are carried on the negative electrode.

11. The fuel cell system of claim 1, wherein the liquid intake port is provided below the liquid discharge port along the vertical direction.

* * * * *